Dec. 7, 1954 W. R. EDDY 2,696,083
FLUID FLOW CONTROL SYSTEM
Filed Dec. 4, 1950 3 Sheets-Sheet 1

INVENTOR.
W. R. EDDY
BY Hudson and Young
ATTORNEYS

Dec. 7, 1954　　　　　W. R. EDDY　　　　2,696,083
FLUID FLOW CONTROL SYSTEM

Filed Dec. 4, 1950　　　　　　　　3 Sheets-Sheet 2

INVENTOR.
W. R. EDDY
BY Hudson and Young

ATTORNEYS

Dec. 7, 1954   W. R. EDDY   2,696,083
FLUID FLOW CONTROL SYSTEM
Filed Dec. 4, 1950   3 Sheets-Sheet 3

INVENTOR.
W. R. EDDY
BY Hudson and Young
ATTORNEYS

United States Patent Office 2,696,083
Patented Dec. 7, 1954

2,696,083

FLUID FLOW CONTROL SYSTEM

William Robert Eddy, Bartlesville, Okla., assignor to Phillips Petroleum Company, a corporation of Delaware Application December 4, 1950, Serial No. 199,027

4 Claims. (Cl. 62—1)

This invention relates to apparatus for controlling flow of fluids. In one embodiment this invention relates to a system for dispensing liquefied gases. In another embodiment this invention relates to apparatus for controlling flow of fluids through a normally closed valve actuated by hydraulic fluid pressure.

From the standpoint of safety it is essential that all connections to liquefied petroleum gas containers be protected as much as possible from the results of mechanical damage. Under a few special circumstances it is entirely possible to assemble various tank outlets with their valves and fittings into a relatively small area and to protect the assembly with a heavy guard. However, on most mobile equipment it is necessary to have pipe lines located in areas which will be vulnerable to breakage through collision. It has been the practice to use excess flow valves to protect liquefied petroleum gas containers against loss of contents through outlet connections in case of pipe breakage. The excess flow valves are generally installed in the tank outlet nozzles. Such a valve is held in a normally open position by means of a spring, and the valve closes automatically when a flow occurs greater than that for which the valve is designed. While the excess flow valve is a reliable safety device under most conditions, there are instances where it cannot perform its desired function. For example, if an excess flow valve is designed to pass 100 gallons per minute and a line break on the downstream side of the valve is such that the break will pass only 75 gallons per minute, the excess flow valve will not close. Obviously, the escape of an inflammable liquid, as liquid propane or butane at such a rate would create a tremendous hazard.

My invention is concerned with a control system in combination with a storage tank containing a fluid under superatmospheric pressure, providing for the emergency shut-off of liquid flow from the storage tank, in the case of line breakage in the dispensing system, or the occurrence of fire in close proximity to the system.

An object of my invention is to provide a system for dispensing gas under pressure. Another object of my invention is to provide safe equipment for handilng liquefied gases, that will be safe as can be devised, and that will comply with the "Standards of the National Board of Fire Underwriters and the NBFU pamphlet No. 58," and all similar standards of safety. Another object is to provide a system for handling liquefied gases. Another object is to provide, in combination with a storage tank containing liquefied gases at superatmospheric pressure, a safe system for dispensing liquid from the tank. Another object is to provide for the control of fluid flow through a normally closed valve actuated by hydraulic fluid pressure. Another object is to provide for the automatic shut-off of liquefied gas flow from a storage tank, when such liquid is being dispensed therefrom or delivered thereinto, in the event of a break or rupture of a conduit carrying such liquid. Other objects will be apparent to those skilled in the art from the accompanying discussion and disclosure.

In accordance with one embodiment of my invention I have provided a system in combination with a storage tank containing a fluid under superatmospheric pressure, for dispensing the fluid from the tank and automatically terminating fluid flow therefrom, in the event of line breakage in the dispensing system, or the occurrence of fire in close proximity to the tank and dispensing system.

In a broad embodiment, the dispensing system of my invention in combination with a tank comprises a fluid dispensing conduit in communication with the tank, a pressure fluid conduit for conducting hydraulic fluid flow under pressure, means for establishing fluid pressure in the pressure fluid conduit, a motor-controlled valve in the fluid dispensing conduit comprising a "shut-off" valve controlling flow of fluid from the tank, a motor controlling the shut-off valve and means biasing the shut-off valve closed. The motor is connected to the fluid pressure conduit and is operated by fluid pressure therein to overcome the biasing means and to open the valve to permit fluid flow therethrough as desired. A pilot valve closed during normal flow of fluid through the dispensing conduit is connected with the pressure fluid conduit, and when moved into an open position bleeds fluid pressure from the pressure fluid conduit thereby permitting the biasing means to close the shut-off valve. The pilot valve is opened in response to an increase in the rate of discharge flow of fluid through the dispensing conduit to above a predetermined value, i. e., one above the rate of fluid flow employed during any time that fluid is being dispensed from the tank. This is done by means of a shaft or vane extending from within the fluid dispensing conduit to a point outside the dispensing conduit in communication with the pilot valve, and adapted to be pivotally moved about a point intermediate its ends, preferably near its mid-point. The shaft is pivotally moved in response to an excess rate of flow of fluid through the dispensing conduit and when so moved is adapted to cause the bleed-off valve to open and to vent fluid pressure from the pressure fluid conduit whereby the biasing means above discussed closes the shut-off valve and stops flow through the dispensing conduit.

In a preferred embodiment the shut-off valve is disposed inside the tank, with the fluid dispensing line and pressure fluid conduit disposed in close proximity to each other, preferably in parallel. At least one fusible plug and generally a plurality is disposed at selected points in the wall of the fluid pressure conduit. The pilot valve is generally a Dil-type or common core-type valve and is positioned so that its stem is disposed in spaced-apart relation with the end of the shaft outside the dispensing conduit, so that when the shaft is pivotally moved in response to an increase in the rate of fluid flow described above, it contacts and moves the stem to unseat the valve and "bleed" fluid pressure from the fluid pressure conduit. Other type pilot valves can be utilized, as for example, a ball-type check valve, a piston-type check valve, a swing-type check valve, or the like, all of which can be adapted to remain closed unless moved into an open position.

The dispensing system of my invention is superior from a safety standpoint to the excess flow valve previously discussed above, because the valve in the motor valve, i. e., the shut-off valve, is in a normally closed position except when fluid is being pumped into or out of the tank, so that except when flow is occurring, the tank is protected at all times by means of a closed shut-off valve. When liquid is being passed through the dispensing line, the system of my invention provides for automatically bleeding, or venting, fluid from the pressure fluid conduit in case of fire in close proximity to the system or in case of line breakage above discussed, whereby in either instance or both, the valve in the liquid dispensing line is closed and the flow of liquid from the tank is terminated. Fusible plugs employed in the pressure conduit wall can be fabricated of such low melting materials as Wood's metal, or bismuth solder, or other such suitable fusible alloys having a melting point lower than that of the materials of which the pressure conduit is fabricated. Generally, fusible plugs are selected having melting points not lower than about 80° C. and not exceeding about 200–300° C., although plugs having melting points outside that range may be utilized if desired. In case of fire in close proximity to the dispensing system, the fusible plugs in the fluid pressure conduit become heated, and melt, providing openings in the wall of the fluid pressure conduit through which fluid under pressure immediately escapes, thus permitting the tank shut-off valve to close.

I prefer to locate the fluid pressure conduit and the gas dispensing line in close proximity to each other, in order that any breakage that occurs in one line will be very likely to occur in the other, so that the combined features of my invention will be employed concomitantly, to terminate flow of liquid from the tank. For these reasons I prefer to dispose the liquid dispensing line and fluid pressure conduit in parallel to each other. It is to be understood however that my invention provides for terminating the flow of liquid from the storage tank when either the pressure fluid conduit or the liquid dispensing line is broken, regardless of whether or not they are in close proximity to each other.

Reference is made to the attached figures illustrative of various embodiments of my invention. It is to be understood that the figures are diagrammatic only and may be altered in many respects by those skilled in the art and yet remain within the intended scope of my invention.

Figure 1:
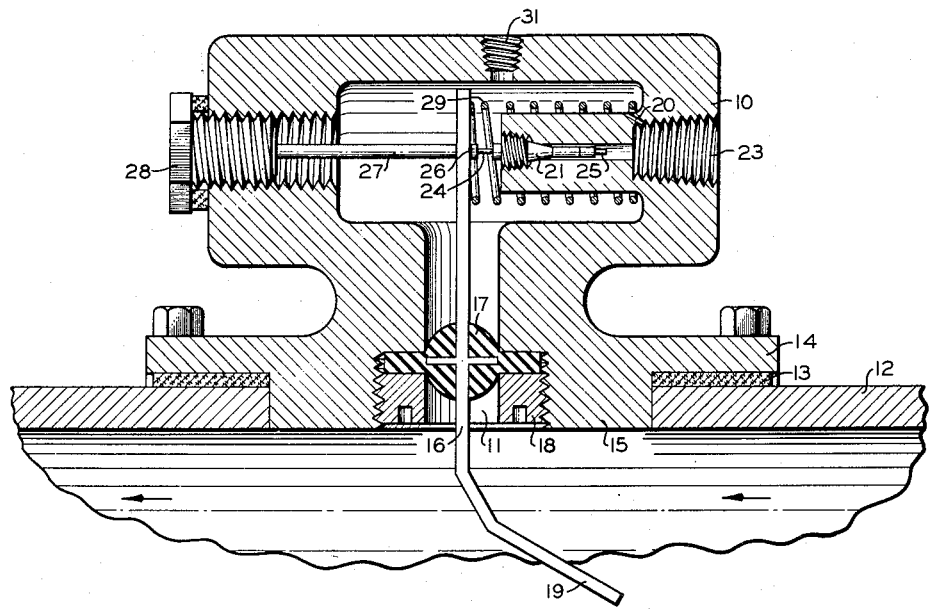
Figure 1 is a sectional elevational view of one form of a pilot valve assembly of my invention in combination with a conduit for conveying fluids.

Referring to Figure 1, pilot valve housing 10 having opening 11 in its side wall is connected to conduit 12 through opening 15 in a side wall thereof by means of gasket 13 and flange 14 so as to permit housing 10 to communicate directly with the interior of conduit 12 through opening 11. Shaft or vane 16 extends from the interior of conduit 12 into housing 10 through openings 11 and 15. Flexible seal ring 17 is secured around at least a portion of shaft 16 extending through openings 11 and 15, and closes the connecting conduit thus formed by openings 11 and 15, so as to flexibly support and seal shaft 16 in such a connecting conduit. Shaft 16 together with flexible seal 17 is held in place in the connecting conduit by means of lock ring 18. In this manner shaft 16 is adapted to be pivotally moved about seal 17. An end portion 19 of shaft 16 is shaped in any desired manner to facilitate contact of the shaft with fluid flowing through conduit 12, often as a flat blade or "paddle" positioned to expose its broadside against the direction of fluid flow. Shaft 16 is thereby adapted to be pivotally moved about seal 17 in response to flow of fluid from a storage tank through conduit 12.

Pilot valve housing 10 is preferably so connected with conduit 12 at a point in close proximity to the fluid storage tank described hereafter, i. e., as close as possible to the shut-off valve, also described further hereafter. In a preferred embodiment, housing 10 is affixed to conduit 12 so that end 19 of shaft 16 is immediately subjacent the discharge side of the shut-off valve.

Valve 21 is any desired type of valve maintained normally closed. Valve 21 preferably is a core-type valve, as for example, a tire valve, often referred to as a "Dil-type valve" and is a type well known in the art. Normally closed valve 21 is connected at its upstream end 25 with fluid inlet 23 in a side wall of housing 10. Valve stem 24 terminating adjacent the downstream end of valve 21 is adapted to unseat normally closed valve 21 when moved in a direction toward the upstream end 22.

Shaft 16 terminates in housing 10 in spaced-apart relation to the end 26 of stem 24. The end of shaft 16 in housing 10 is biased in a position out of contact with stem 24 by spring biasing means 29 which counteracts the force exerted against a lower end 19 of shaft 16 by fluid flowing against it through conduit 12. Member 27 extending from cap 28 in a side wall of housing 10 supports the position of shaft 16 when out of contact with end 26. When the force of the fluid flowing in conduit 12 against end 19 of shaft 16 is greater than the biasing effect against shaft 16, exerted by spring 29, shaft 16 is caused to pivot about seal 17 and to contact and move stem 24 to unseat valve 21. At such a time, fluid from inlet 23 is caused to pass through valve 21. Fluid outlet 31 in a side wall of housing 10 is in direct communication with the outlet side of valve 21 and permits discharge of fluid from housing 10 admitted through valve 21. The biasing effect of spring 29 is predetermined so that it is overcome only when the force of fluid flow through conduit 12 against shaft 16 therein is representative of the rate of flow of that fluid higher than utilized during "normal flow" as discussed more fully hereafter.

Figure 2:
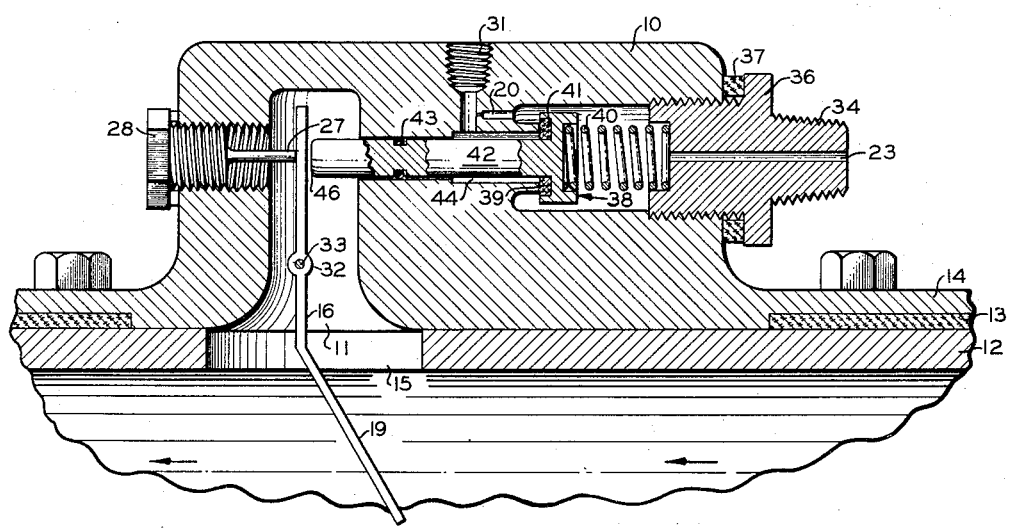
Figure 2 is a sectional elevational view of another form of a pilot valve assembly of my invention in combination with a conduit for conveying fluids.

Referring to Figure 2, housing 10 is connected with conduit 12 in the manner illustrated in the discussion of Figure 1, i. e., so that it is connected with the interior of conduit 12 by a connecting conduit formed by openings 11 and 15. Shaft 16, extending from the interior of conduit 12 into housing 10 through the connecting conduit, is pivotally supported near its mid-point 32. Support at point 32 is any desired pivotal support such as a pin 33 extending from an inner side wall of housing 10 as illustrated. The force of fluid passing through conduit 12 against shaft 16 therein causes shaft 16 to be pivotally moved about pin 33.

Fluid inlet 23 in housing 10 is disposed through nipple 34 supported in housing 10 by means of flange 36 and gasket 37. Valve 38 in housing 10 comprises nozzle 39, seal 41, and valve stem 42, and is biased closed by spring means 40.

Valve 38 is in communication with shaft 16 only through passageway 44. O ring 43 is secured around valve stem 42 in passageway 44 thereby sealing stem 42 so as to prevent flow of fluid from conduit 12 through passageway 44 into direct contact with valve 38.

The end 46 of stem 42 is positioned in spaced-apart relation in housing 10 with the upper end of shaft 16. Valve 38 is biased closed by spring 40 with sufficient force to counteract the force against the lower end of shaft 16 exerted by the flow of fluid against it through conduit 12. Member 27 of cap 28 extends into housing 10 to support the position of shaft 16 when out of contact with end 46 of valve stem 42. When the force of fluid flow in conduit 12 against shaft 16 is greater than the biasing effect against normally closed valve 38, shaft 16 is caused to pivot about pin support 33 and to contact and move stem 42 so as to unseat valve 38. At such a time, fluid is permitted to pass from inlet 23 through valve 38. Fluid outlet 31 is in direct communication with the outlet side of valve 38 and thereby permits discharge from housing 10 of fluid passed through valve 38. The biasing effect of spring 40 against valve 38, i. e., to hold valve 38 closed, is predetermined to be overcome only when the force of fluid flowing through conduit 12 against shaft 16 therein is representative of a flow rate higher than that to be utilized during "normal flow" of fluid through conduit 12.

Figure 3:
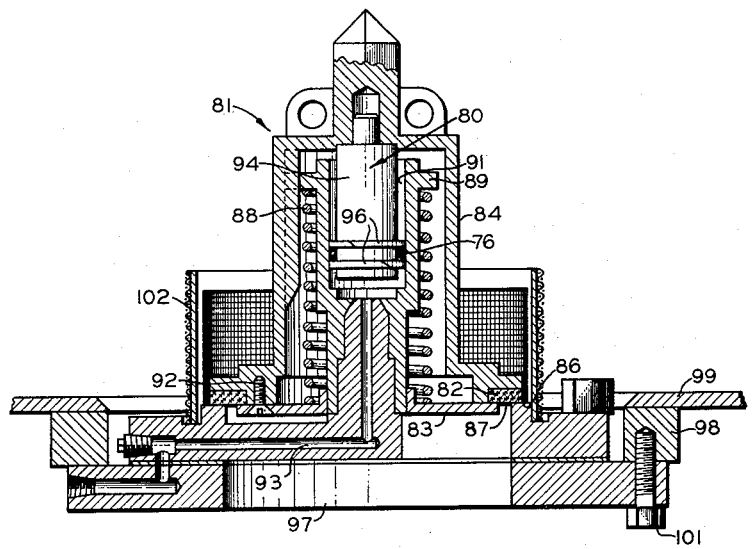
Figure 3 is a sectional elevational view of a motor valve operated by fluid pressure, which can be employed to control flow of fluid to and from the storage tank.

With reference to Figure 3, illustrative of a motor valve operated by fluid pressure, that can be employed to control flow of fluid to and from the storage tank as briefly discussed hereinabove, motor valve 81 is comprised of valve disc 82, held in place by disc retainer 83 and cap member 84 against valve seat 86. The valve 87 as illustrated is in a closed position and is biased closed by means of coil spring 88 supported from points 89 on the exterior wall of the top portion of piston chamber 91. Disc retainer 83 is held in place by screws 92. Valve disc 82 is raised from seat 86 by raising cap member 84 in an upward direction against the force of spring 88. This is done by means of fluid pressure exerted upwardly against the interior of cap 84, by hydraulic fluid introduced under pressure through conduit 93 against the bottom of piston 94. Piston 94 is disposed vertically inside piston chamber 91 and is held in alignment by piston rings 96 separated by an O ring 76. In response to pressure of hydraulic fluid thus introduced, piston 94 is raised upwardly against the top portion of cap member 84, raising it vertically. When this occurs, the extent to which the valve is opened is dependent upon fluid pressure, which in turn is regulated to permit the desired rate of flow of liquid, to be passed through valve 87. Liquid passed through valve 87 is discharged through opening 97.

Suitable arrangements can be employed such as ring 98 welded to the outside of the tank 99 to which the main body of motor valve 12 can be secured by means of studs 101. Screen 102 is disposed to prevent contact of foreign materials such as tank sediments, mill scale, and the like, within tank 99, with valve disc 82 and valve seat 86, thereby preventing any possible damage to these members of motor valve 81.

Figure 4:
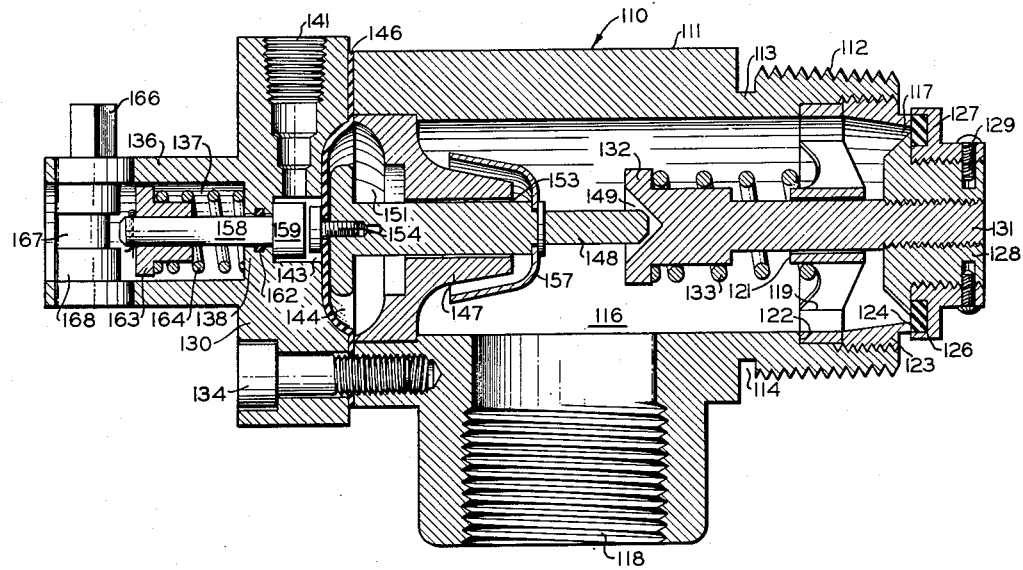
Figure 4 is a sectional elevational view of another motor valve operated by fluid pressure, that can be employed to control flow of fluid to and from the storage tank.

Figure 4 is illustrative of another motor valve operated by fluid pressure, that can be employed to control flow of fluid to and from the storage tank. This motor valve 110, is comprised of a valve housing 111 provided exteriorly with a connecting means such as threads 112 and a weakened relatively easily frangible portion 113 formed by encompassing valve housing 111 with groove 114. Valve housing 111 is provided with chamber 116 having openings 117 and 118. At one end of valve housing 111, there is provided a spider 119 having a centrally located opening 121 therein and held in place in an inner recess 122 by a valve seat 123. Valve seat 123 is provided with a seating surface 124 against which presses sealing means 126 mounted in cap ring 127 which in turn is removably mounted on valve head 128 and is held firmly in place by screws 129. Valve stem 131 is likewise removably attached to valve head 128 and extends through opening 121 in spider 119 which maintains valve head 128 in proper alignment so that sealing means 126 will seat properly on valve seating surface 124 of valve seat 123.

The end of valve stem 131 opposite valve head 128 is provided with a shoulder 132. Spring 133 is provided to press against shoulder 132 and spider 119 in order to bias valve head 128 into a normally closed position.

The end of valve housing 111 opposite valve head 128 is closed by plate 133 held in place against housing 111 by bolts or screws 134. Plate 130 is provided with a bonnet 136 having a recess 137 and a guide portion 138. Plate 130 is also provided with fluid inlet 141 for the passage of hydraulic fluid into and out of inner chamber 143 of plate 130. The inner surface of plate 130 can be formed to provide a recess 144 adaptable to receive flexible diaphragm 146 which is located at and held in place across the outer end of valve housing 111 by plate 130.

Valve housing 111 is provided with diaphragm stem guide 147 having an opening therein suitably arranged to align diaphragm stem 148 with recess 149 in valve stem 131. Diaphragm stem guide 147 is adapted to close chamber 116 next to diaphragm 146. Diaphragm stem 148 is attached at one end to diaphragm 146 by means of diaphragm bolt 154. Stem guide 147 is so constructed as to provide a loose fit around diaphragm stem 148 and thereby permit a passageway 153 between stem guide 147 and diaphragm stem 148. Diaphragm stem 148 is further provided with a shield 157 which can be of such structure as to fit loosely over the inner surface of stem guide 147 so as to form a passage way therebetween.

Located in the recess 137 of valve bonnet 136 is push pin 158 having a push pin head 159 adapted to coact with diaphragm bolt 154. O ring 162 around pin 158 provides a seal preventing passage of fluid through guide portion 138 into recess 137. At the opposite end of push pin 158 is situated a spring retainer 163 coacting with spring 164 to bias push pin head 159 away from contact with bolt 154. Valve bonnet 136 at its outer end is formed to receive an actuating member designated generally as 166 which is adapted to coact with the end of push pin 158 to manually move diaphragm bolt 154 so as to unseat valve 123, 126. Actuating member 166 can be comprised of annular bearing shoulders 168 fitted into bonnet 136 as shown. Eccentric cam 167 of actuating member 166 is adapted to coact with the end of push pin 158 while shoulders 168 are adapted to coact with the sides of push pin 158 to hold actuating member 166 in place in bonnet 136 when push pin head 159 is out of contact with bolt 154. When push pin head 159 is advanced to contact bolt 154 to move valve stem 131, the force exerted by spring 164 through push pin 158 on shoulder 167 will maintain contact of pin 158 with cam 167 between shoulders 168 and hold actuating member 166 in desired position. Cam 167 is located eccentrically from the axes of bearing shoulders 168 so that it exerts a cam action against push pin 158 when actuating member 166 is rotated in bonnet 136.

Figure 6:
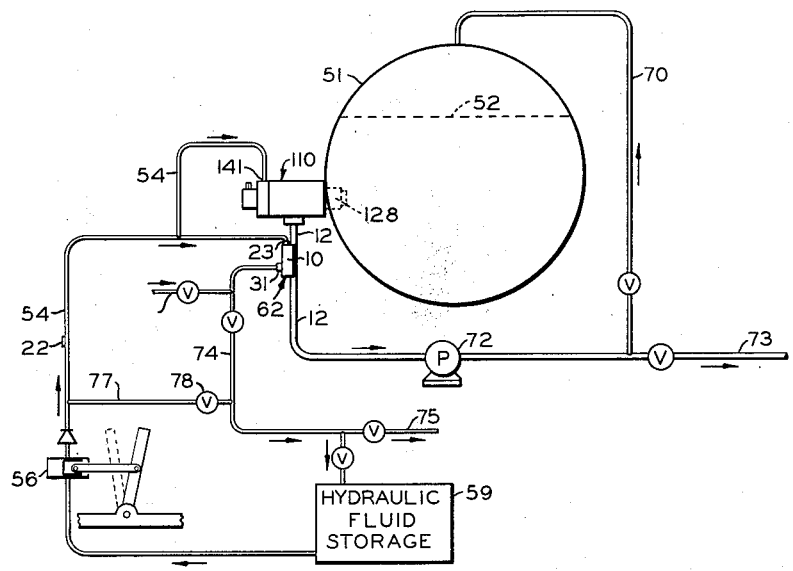
Figure 6 is a diagrammatic elevational view of a storage tank in combination with a fluid dispensing system, embodying another form of my invention.

As illustrated in Figure 6, the motor valve of the type illustrated in Figure 4 is caused to open and close by regulating the pressure of hydraulic fluid introduced into inlet 141.

Figure 5:
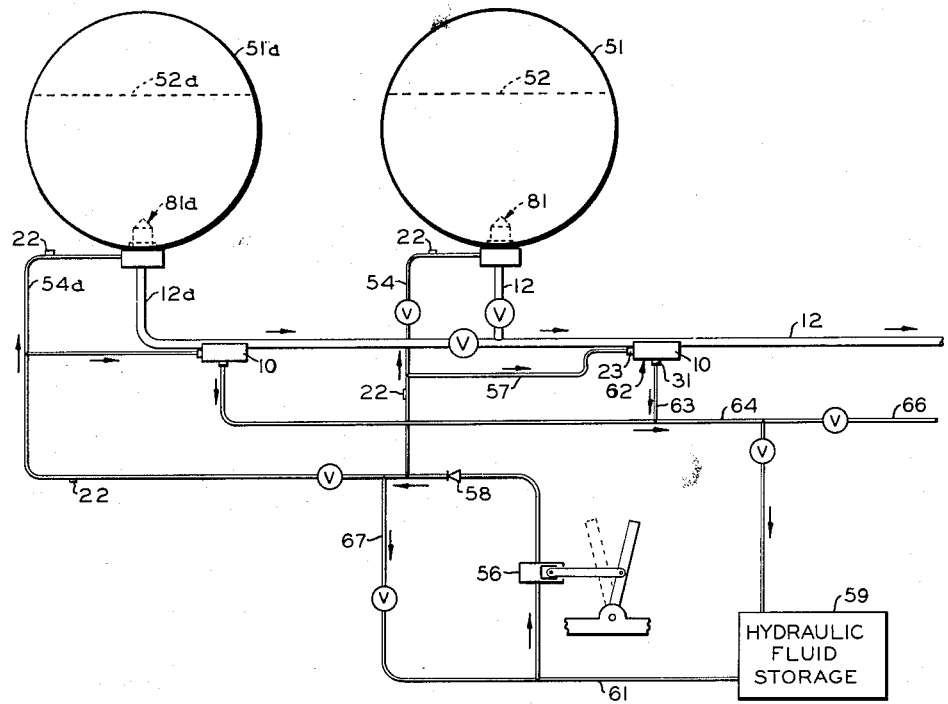
Figure 5 is a diagrammatic elevational view of a plurality of storage tanks in combination with a fluid dispensing system, embodying one form of my invention.

With reference to Figure 5, storage tank 51 is provided for storing a fluid under pressure, generally liquefied hydrocarbon gases 52 and such vapors as may be present. A liquid dispensing conduit 12 is connected with tank 51 in communication with fluid therein. Conduit 54 is a hydraulic pressure fluid conduit. Pressure fluid pump 56 is connected to one end of conduit 54 to withdraw fluid from storage 59 and to deliver same under pressure into conduit 54. A motor valve 81, comprises an outlet shut-off valve 87 in liquid dispensing line 12, preferably disposed inside tank 51, and a fluid operated motor 80 and a spring 88, biasing the valve 87 closed (see Figure 3). Motor 80 is connected to conduit 54 and operated by fluid pressure therein to overcome the biasing effect of spring 88 to move valve 87 into an open position. Pilot valve assembly 62 of the type illustrated in detail in Figures 1 and 2, preferably the valve assembly illustrated in Figure 2, is connected to fluid dispensing conduit 12 in the manner illustrated in Figure 2. Fluid inlet 23 in housing 10 of pilot valve assembly 62 is connected with fluid pressure conduit 54 by line 57. Check valve 58 is located at a point in close proximity to the discharge side of pump 56 to insure constant pressure of fluid line 54, i. e., to prevent fluid in line 54 from "backing" through pump 56 during normal dispensing operations.

In the operation of the embodiment illustrated in Figure 5, hydraulic fluid is withdrawn from storage 59 through line 61 into the low pressure side of pump 56 and discharged therefrom through check valve 58 into conduit 54 to develop a hydraulic fluid pressure in line 54 such as from 10 to 20 p. s. i. g. to as high as 300 p. s. i. g., dependent on the pressure exerted by fluid in the tank 51. Fluid under pressure in conduit 54 is passed to motor 80 of motor valve 87 causing the motor to move shut-off valve 87 into an open position, permitting thereby a flow of liquid from tank 51 through fluid dispensing conduit 12. Normal rate of liquid flow from tank 51 can be any desired value, often from 75 to 300 gallons per minute. It is an abnormal flow by which I mean liquid flow from tank 51 through conduit 12 at a rate higher than the normal rate, with which my invention is concerned. Ordinarily such abnormal flow results from a break in line 12, or in downstream lines or vessels in direct communication therewith, thereby causing fluid to escape from the system and to constitute a serious fire hazard. In the event that such a break occurs, it is desirable to terminate the flow of liquid 52 from tank 51, and this is done by bleeding or venting fluid pressure from conduit 54 thereby relieving the fluid pressure on motor 80 and permitting spring 88 to close valve 87. Bleeding of fluid from conduit 12 is done by means of pilot valve assembly 62. As illustrated in Figures 1 and 2, during normal fluid flow through conduit 12 the pilot valve in housing 10 is biased closed against the force of fluid flow through conduit 12. In case of a break in fluid dispensing line 12 at any point downstream from pilot valve assembly 62, the flow of fluid through line 12 is immediately increased to a value above "normal." In this case the force of the flowing fluid in conduit 12 against the shaft 16 therein, exceeds the force of the biasing effect exerted against the pilot valve in housing 10 so that shaft 16 is caused to pivot about its support member to move the pilot valve stem so as to unseat the pilot valve and permit hydraulic fluid from line 54 to enter pilot valve assembly 62 through line 57 and fluid inlet 23, and to be discharged through outlet 31 into line 63. In this manner fluid pressure is discharged from pressure fluid conduit 54 and returned through line 64 to storage 59 or when desired discharged directly through line 66 to the atmosphere. When it is desired to manually terminate normal flow of liquid from tank 52, fluid under pressure in line 54 can be withdrawn therefrom and returned to storage 59 through line 67, thereby permitting spring 88 to bias valve 87 closed.

In resuming normal flow it is necessary only to again introduce hydraulic fluid under pressure to motor 80 by means of pump 56, since shaft 16 in response to a decrease in the flow of fluid through conduit 12 from "abnormal" to "normal" pivots about support 33 in a reverse direction to permit biasing means 40 to close valve 38 (see Figure 2).

Constricted passageway 20 interconnecting conduits 23 and 31 (see Figures 1 and 2) provides for a gradual venting of fluid from line 54, the venting rate depending on the dimensions of the passageway. Should the operator fail to manually vent the fluid pressure at the end of the dispensing operation, as might be the case when a supplemental valve is used in line 12 downstream from tank 51, that pressure will be automatically vented to cause the shut-off valve to be closed. Obviously the operator can restore such vented fluid pressure if desired. Also, pasasgeway 20 can be employed as desired.

Referring to Figure 6, motor valve 110, illustrated in Figure 4, is positioned in fluid dispensing conduit 12. Motor valve 110 is connected to fluid pressure conduit 54 and operated by fluid pressure therein to overcome the biasing effect of the spring 133 and to move valve head 128 into an open position. In the embodiment illustrated in Figure 6, hydraulic fluid is introduced under pressure through line 54 to diaphragm 146 to overcome the biasing effect of spring 133 and to cause head 128 to be unseated, permitting fluid to flow from tank 51 through outlet 116 of valve 110, and to be discharged through fluid dispensing conduit 12. Fluid discharged from valve 110 is pumped from conduit 12 by means of centrifugal pump 72 to a desired utilization through line 73. Fluid discharged from pump 72 is by-passed through line 70 and returned to tank 51, as desired, in order to permit regulation of fluid flow through line 73.

Pilot valve assembly 62 connected with fluid dispensing conduit 12 in the manner discussed in Figure 5 permits normal flow to be conducted through conduit 12. In the case of a break in the line, i. e., an abnormally high rate of flow of fluid through conduit 12, pilot valve assembly 62 functions in the manner already discussed in connection with Figure 5, to vent fluid pressure from fluid pressure conduit 54 thereby causing the valve in valve 110 to be closed. In such a case, shaft 16 is caused to pivot about its pivotal support 32 in response to the flow of fluid through conduit 12 at an abnormally high rate to cause the pilot valve in housing 10 to open, thereby venting hydraulic pressure fluid from line 54, by allowing same to pass through fluid inlet 23, and the pilot valve, and outlet 31 in housing 10, through line 74 to hydraulic fluid storage 59 or to be vented to the atmosphere as desired through line 75. If desired, fluid pressure can be vented from line 54 manually through line 77 and valve 78.

Fusible plugs 22 are disposed preferably at a plurality of points in conduits 54, of Figures 5 and 6, so that in the case of occurrence of fire in close proximity to the liquid flow system, these plugs become heated and melt, providing thereby openings in the side wall of such conduits 54 through which fluid under pressure therein can escape, whereby fluid is vented from the motor valve 81, or 110, permitting the biasing spring to close the valve, terminating flow of liquid from tank 51. As stated hereinbefore I prefer to utilize conduits 12 and 54 disposed in parallel. In a preferred form of one such embodiment, a flexible fluid pressure conduit 54 is disposed in close parallel relation to a flexible dispensing line 12 along the entire length of line 12. This is particularly advantageous when dispensing liquid from a mobile unit to a liquid storage, as for example a storage tank in a domestic heating system.

The flow system of my invention offers particular advantages in the operation of mobile units for the reason that in such cases it may happen that during the time the liquefied petroleum gas is being dispensed from, or being charged into tank 51, the dispensing unit is damaged by collision therewith of a passing vehicle, or by interference from sources uncontrolled by the operator of the unit. Any line breakage during dispensing operation is serious for the reason that it endangers the surrounding area by discharging inflammable materials thereinto. When that happens the flow of liquid from tank 51 is abnormally high and valve 21 (Figure 1) or valve 38 (Figure 2) is immediately moved into an open position and fluid is vented from line 54 and the shut-off valve is closed. Similarly when for any reason conduit 54 is broken, fluid pressure is vented therefrom, permitting the valve 110, or 81, to close.

When referring herein to fluids I mean to refer to not only liquefied gases but to fluids of any type under pressure, such as ammonia, or the like, whether in gaseous or liquid states.

In one embodiment of my invention the pilot valve housing need not necessarily be rigidly connected to the fluid dispensing conduit. In such an embodiment the shaft 16 extends from the interior of the fluid dispensing conduit into a liquid tight housing affixed to that conduit, so as to communicate with a pilot valve in a separate pilot valve housing. This can be done, in one manner, by extending the pilot valve stem member from the separate pilot valve housing, into the affixed housing, in communication with the end of the shaft 16 therein, or engaging the pilot valve with the end of the shaft 16 in the affixed housing, via a supplemental shaft, rigid or flexible as desired.

As will be evident to those skilled in the art, various modifications can be made or followed, in the light of the foregoing disclosure and discussion, without departing from the spirit or scope of the disclosure or from the scope of the claims.

I claim:
1. In a fluid dispensing system comprising a tank for fluid to be dispensed, a main fluid dispensing conduit connected to said tank, a motor valve connected with said main conduit and disposed within said tank, said motor valve being biased to closed position and adapted to be opened by application of pressure of a hydraulic fluid, a source of said hydraulic fluid, a hydraulic fluid conduit in communication with said source and with said motor valve, and means positioned between said source and said motor valve for establishing pressure of said hydraulic fluid in said hydraulic fluid conduit, the improvement which comprises, in combination: a pilot valve housing having a connecting conduit in a side wall thereof, said connecting conduit being disposed to register with an opening in said main conduit; a shaft extending from the interior of said main conduit through said connecting conduit into said housing, said shaft having a transverse extension; a flanged, flexible seal ring around said shaft and closing said connecting conduit so as to flexibly support and seal said shaft, said transverse extension being imbedded in an enlarged part of said ring; said shaft being pivotally movable about said seal in response to change in the rate of fluid flow through said main conduit; a hydraulic fluid inlet in the side wall of said housing and in open communication with said hydraulic fluid conduit; a pilot valve biased to closed position in said housing and actuated in response to pivotal movement of said shaft, the inlet side of said valve being in communication with said hydraulic fluid inlet; biasing means for said pilot valve, said biasing means being positioned within said hydraulic fluid inlet; said pilot valve being adapted to be moved into an open position by said shaft when said fluid flow exceeds a predetermined value; and a hydraulic fluid outlet in a side wall of said housing in communication with the outlet side of said pilot valve and with said source of hydraulic fluid.

2. The apparatus of claim 1 wherein said pilot valve is a core-type valve positioned in said housing so that said valve is opened by contact with said shaft in response to a flow rate in said main conduit in excess of a predetermined value.

3. The apparatus of claim 1 wherein said fluid dispensing conduit and said hydraulic fluid conduit are disposed parallel to and adjacent each other.

4. The apparatus of claim 1 wherein at least one plug fusible at a temperature within the limits of 80 to 300° C. is disposed in the wall of said hydraulic fluid conduit.

References Cited in the file of this patent

UNITED STATES PATENTS

| Number | Name | Date |
|---|---|---|
| 1,466,412 | Samain | Aug. 28, 1923 |
| 1,588,275 | Schutee | June 8, 1926 |
| 1,960,831 | Shand | May 29, 1934 |
| 2,154,777 | Schalos | Apr. 18, 1939 |
| 2,569,554 | Buttolph | Oct. 2, 1951 |

FOREIGN PATENTS

| Number | Country | Date |
|---|---|---|
| 578,515 | Great Britain | 1933 |